United States Patent
Voss

(10) Patent No.: US 6,620,358 B2
(45) Date of Patent: Sep. 16, 2003

(54) PROCESS FOR MANUFACTURING TABLETS

(76) Inventor: Gunter Voss, Ziegeladel 10, D-86911 Diessca (DE)

(*) Notice: Subject to any disclaimer, the term of this patent is extended or adjusted under 35 U.S.C. 154(b) by 297 days.

(21) Appl. No.: 09/761,032

(22) Filed: Jan. 16, 2001

(65) Prior Publication Data
US 2001/0001512 A1 May 24, 2001

Related U.S. Application Data

(63) Continuation-in-part of application No. 08/675,775, filed on Jul. 3, 1996, now abandoned.

(51) Int. Cl.⁷ ................................................ B29C 43/20
(52) U.S. Cl. ........................................ 264/113; 264/112
(58) Field of Search ................................ 264/112, 113

(56) References Cited

U.S. PATENT DOCUMENTS

| | | |
|---|---|---|
| 3,096,248 A | 7/1963 | Rudzki |
| 3,577,490 A | 5/1971 | Welsh |
| 4,323,530 A | 4/1982 | Voss et al. |
| 4,388,343 A | 6/1983 | Voss et al. |
| 4,707,309 A | 11/1987 | Voss et al. |
| 4,758,142 A | 7/1988 | Voss et al. |
| 4,832,880 A | 5/1989 | Staniforth |
| 5,356,577 A | 10/1994 | Boldis et al. |
| 5,609,908 A | * 3/1997 | Voss .......................... 427/2.14 |

FOREIGN PATENT DOCUMENTS

| | | |
|---|---|---|
| DE | 42 03 273 A1 | 8/1992 |
| DE | 41 03 413 C1 | 11/1992 |

* cited by examiner

Primary Examiner—Mary Lynn Theisen
(74) Attorney, Agent, or Firm—St. Onge Steward Johnston & Reens LLC

(57) ABSTRACT

The present invention discloses a process for manufacturing tablets using a press provided with at least one compression chamber having an upper and a bottom mold and a lubrication device having at least one two-substance nozzle which sprays the lubricant onto the walls of said compression chamber in a cone shaped pattern, wherein at least one additive is added to the lubricant to thereby apply the additive onto the surface of the tablets during the manufacturing process.

13 Claims, 3 Drawing Sheets

PROCESS FOR MANUFACTURING TABLETS

RELATED APPLICATIONS

The present application is a continuation-in-part of U.S. patent application Ser. No. 08/675,775, filed Jul. 3, 1996, now abandoned.

FIELD OF THE INVENTION

The present invention relates to a process for manufacturing tablets using a press provided with at least one compression chamber having an upper and a bottom mold and a lubricating device having at least one two-substance nozzle, wherein the nozzle sprays the lubricant so that it is deposited on the walls of the compression chamber in a cone shaped pattern.

BACKGROUND OF THE INVENTION

Processes for manufacturing tablets are often executed on tablet presses such as round presses. Round presses are provided with a number of processing stations in which the individual processing steps required for manufacturing tablets are executed. In other words, when an additive is to be added to the manufacturing process of a tablet, the setup of the press has to be changed accordingly. However, it is frequently impossible to add another processing station to the existing setup, because the dimensions of the press are determined by the setup of the round table. Therefore, when additives, such as flavoring or coloring substances for instance, are to be applied to the tablet as a coating, a separate step is required, which is usually executed in a device separate from the tablet press.

Processes for manufacturing tablets as such can be executed by using the apparatus disclosed in German Patent No. DE 41 03 413 C1. According to DE 41 03 413 C1, the lubricant is applied to the compression tool of a tablet press by a two-substance nozzle provided with an inner nozzle, coaxially surrounded by an annular space.

SUMMARY OF THE INVENTION

An object of the prevent invention is to provide a process for manufacturing tablets in which at least one additive can be added to the manufacturing process at any time without altering the setup of the press.

This and other objects of the present invention are achieved by provision of a process for manufacturing tablets using a press provided with at least one compression chamber having an upper and a bottom mold and a lubricating device having at least one two-substance nozzle which sprays the lubricant onto the walls of the compression chamber in a cone shaped pattern, wherein at least one additive is added to the lubricant to thereby apply the additive onto the surface of the tablets during the manufacturing process. Thereby, a tablet is obtained comprising an inner region of compressed tablet substance having a volume in the range of 85% to 95% of the total tablet volume and an outer surface region of compressed additive having a volume in the range of 5% to 15% of the total tablet volume.

Other objects, advantages and novel features of the present invention will become apparent from the following detailed description of the invention when considered in conjunction with the accompanying drawings.

DETAILED DESCRIPTION OF THE INVENTION

An element of the prevent invention is that at least one additive is added to the lubricant that is applied to the walls of the press. The present process permits the introduction of additives onto tablets at precise dosages during the manufacturing process without interfering with the setup of the press.

Figure 1:
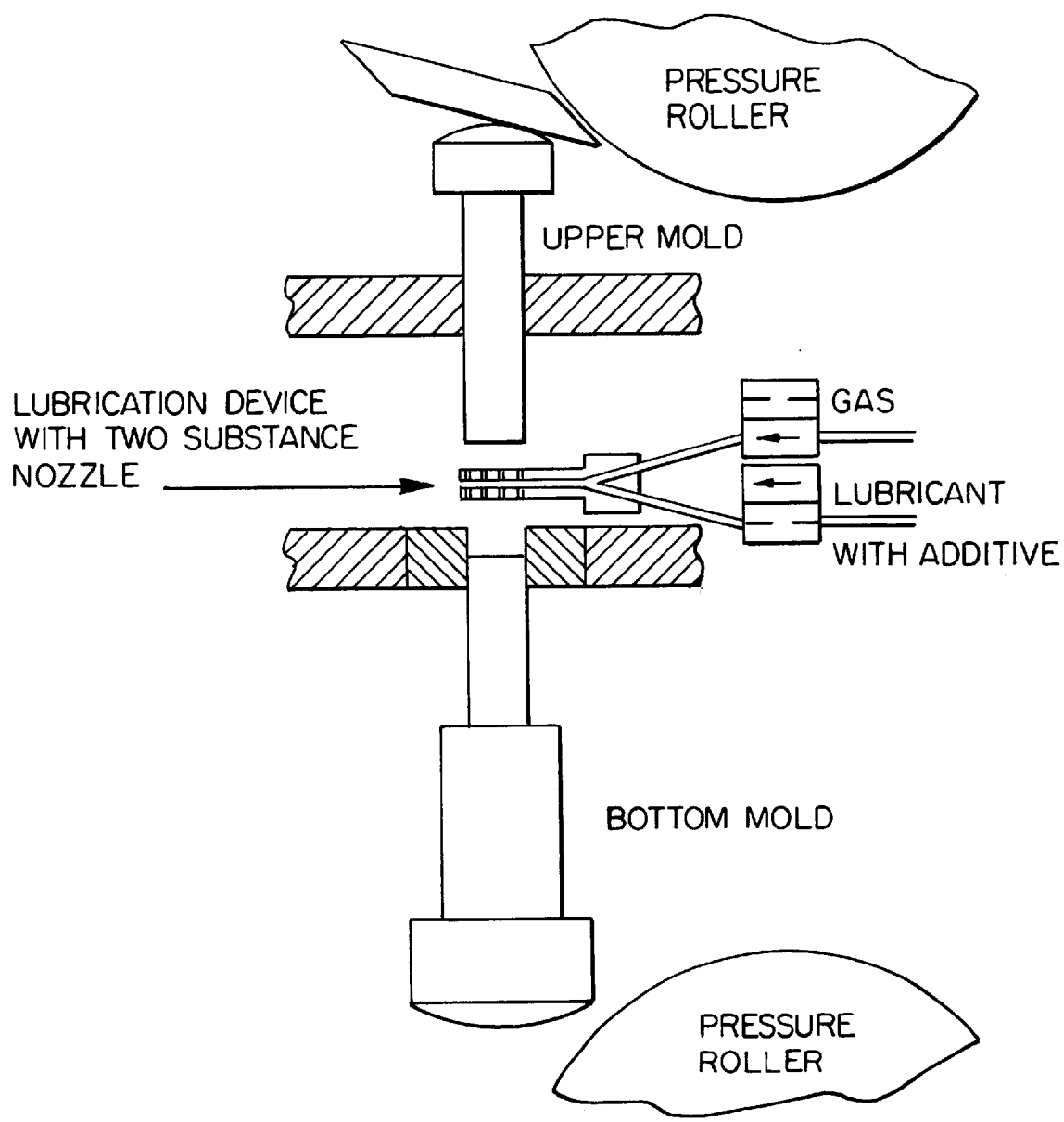
FIG. 1 is a schematic representation of an apparatus for executing the process according to the present invention.

The process of the present invention can be executed by using the apparatus shown in FIG. 1.

Figure 2:
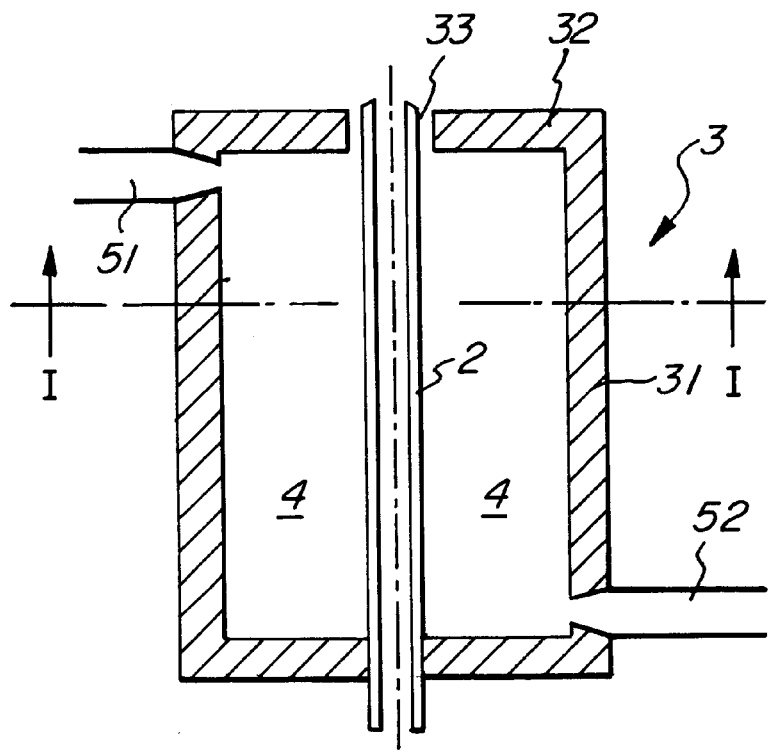
FIG. 2 represents a longitudinal cross section of a two-substance nozzle according to DE 41 03 413 C1.
Figure 3:
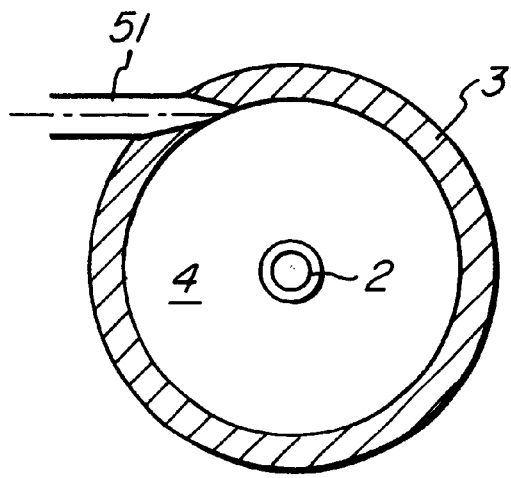
FIG. 3 represents a cross sectional view of the two-substance nozzle taken along I—I of FIG. 2; and, FIG. 4 represents a detailed view of the front face of a two-substance nozzle.

FIGS. 2 and 3 represent a two-substance nozzle as disclosed in DE 41 03 413 C1, wherein the two-substance nozzle has a cylindrical shaped body 3 with two gas inlets 51, 52, a gas outlet 33, a shell 31 and a front face 32. The body 3 of the two-substance nozzle is also provided with an inner nozzle 2, surrounded by an annular space 4.

Figure 4:
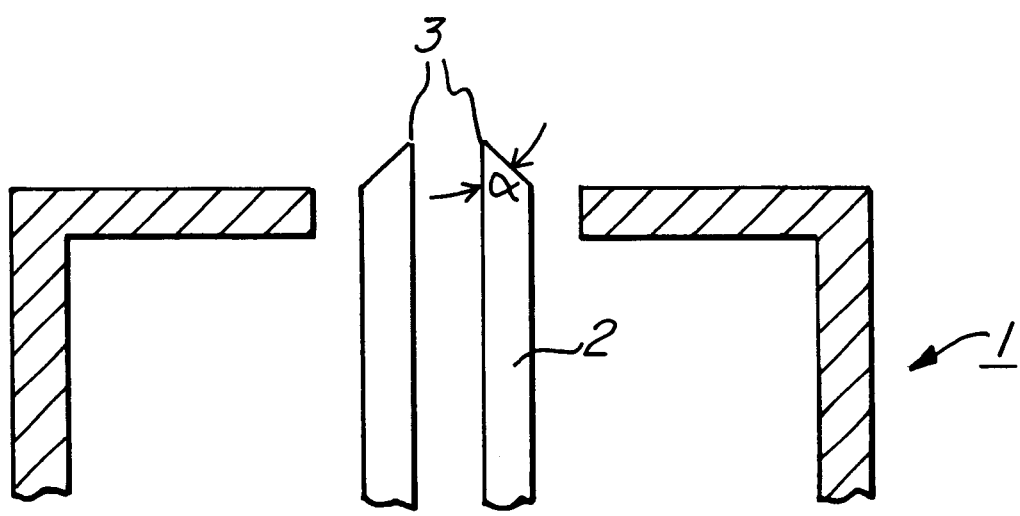

FIG. 4 represents an detailed view of the front face of a two-substance nozzle, showing the inner nozzle and the sharp edge break of the nozzle.

According to the process of the present invention, the proportion of lubricant to additive is in the range of 5 to 95% and 95 to 5%.

In a preferred embodiment, these additives are flavoring or coloring substances, wherein the flavoring substances may be common commercial sweeteners. In this case, the substance or substances may be mixed with a carrier and then added to the lubricant.

In another preferred embodiment, the additive might be one or more bittering agents in a water-soluble preparation. The application of such bittering agents to tablets is useful to prevent inadvertent misuse by children. In this case, it might is be necessary to include instructions for washing the tablets prior to intake in order to remove the bittering agent.

In another preferred embodiment, the additive is applied as a coat of film onto the surface of the tablet, wherein the additive is first mixed with a film former and then added to the lubricant to form a mixture. The mixture is then applied with a device, such as that disclosed in DE 41 03 413 C1, onto the surface or onto selected surface areas of the compression chamber and of the active tool of the compression chamber to thereby coat the tablet with the additive during the manufacturing process.

According to the process of the present invention, it is particularly advantageous to apply the additives in a melted state onto the walls of the compression chamber by using at least one heatable two-substance nozzle.

In a further preferred embodiment, a nozzle having a proportional piezoelectronic valve, preferably in the feed means, is used, which permits precise work even at high temperatures and pressures. In this regard, it is noted that U.S. Pat. No. 4,388,343 discloses a method and an apparatus comprising, for instance, piezoelectronic transducers.

A valve of this type is proportionally triggered and ensures exact dosages of the additive by adjusting the flow amount and the cross section. The triggering of such a valve is preferably controlled by a computer or an electronic control unit, which receives signals from pressure and/or temperature sensors for example.

According to the present invention, the additive may be a sweetener such as Aspartam and Eudragit RL 30 D or a colorant such as Sikovit green lacquer.

The present invention, therefore, provides a process for manufacturing tablets in which at least one additive can be added to the manufacturing process at any time without altering the setup of the press.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for manufacturing tablets, comprising the steps of:

mixing an additive and a lubricant to obtain a mixture, said additive comprising at least one of a flavoring substance, a coloring substance, a sweetener, and a bittering agent;

spraying the mixture onto inner surfaces of a compression chamber;

filling a tablet substance into the compression chamber; and compressing the tablet substance and the mixture simultaneously to obtain a tablet comprising an inner region of compressed tablet substance having a volume in the range of 85% to 95% of the total volume of the tablet and an outer surface region of compressed additive having a volume in the range of 5% to 15% of the total volume of the tablet.

2. The process according to claim 1, further comprising the steps of mixing a flavoring or coloring substance with a carrier and then adding the flavoring or coloring substance and the carrier to the lubricant.

3. The process according to claim 1, comprising the step of applying the additive as a coat of film onto the surface of the tablet, wherein the additive is first mixed with a film former and then the additive and film former are added to the lubricant.

4. The process according to claim 1, comprising the steps of melting the additive with at least one heatable two-substance nozzle to form a melted additive and then applying the melted additive onto the walls of the compression chamber.

5. The process according to claim 1, comprising the steps of adding the additive to the lubricant with a proportional valve to thereby control the dosage of the additive.

6. The process according to claim 1, wherein the proportion of lubricant to additive is in the range of 5 to 95% and 95 to 5%.

7. The process according to claim 1, wherein said additive comprises said flavoring substance.

8. The process according to claim 1, wherein said additive comprises said coloring substance.

9. The process according to claim 1, wherein said additive comprises said bittering agent.

10. The process according to claim 1, wherein said additive consists of said flavoring substance.

11. The process according to claim 1, wherein said additive consists of said coloring substance.

12. The process according to claim 1, wherein said additive consists of said bittering agent.

13. The process according to claim 1, wherein said additive comprises said sweetener.

* * * * *